United States Patent
Sato

[11] Patent Number: 5,943,518
[45] Date of Patent: Aug. 24, 1999

[54] VOLTAGE CONTROL DEVICE

[75] Inventor: Koichi Sato, Tokyo, Japan

[73] Assignees: Asahi Kogaku Kogyo Kabushiki Kaisha; Dai Nippon Printing Co., Ltd, both of Tokyo, Japan

[21] Appl. No.: 08/806,212

[22] Filed: Feb. 26, 1997

[30] Foreign Application Priority Data

Feb. 28, 1996 [JP] Japan .................................. 8-067288
Jul. 19, 1996 [JP] Japan .................................. 8-209169

[51] Int. Cl.$^6$ .................................................. G03B 19/00
[52] U.S. Cl. ............................ 396/429; 396/436; 349/33
[58] Field of Search ........................... 396/30, 429, 439, 396/436; 349/25, 29, 33

[56] References Cited

U.S. PATENT DOCUMENTS

| | | |
|---|---|---|
| 5,268,763 | 12/1993 | Takanashi et al. . |
| 5,298,974 | 3/1994 | Aono et al. ............................ 355/211 |
| 5,412,443 | 5/1995 | Suzuka . |
| 5,424,156 | 6/1995 | Aoki et al. . |
| 5,467,204 | 11/1995 | Hatano et al. ......................... 358/482 |
| 5,555,205 | 9/1996 | Okabe ................................... 365/108 |
| 5,629,920 | 5/1997 | Sakano et al. ......................... 369/120 |

FOREIGN PATENT DOCUMENTS

| | | |
|---|---|---|
| 5-2280 | 1/1993 | Japan . |
| 5165005 | 6/1993 | Japan . |
| 6130347 | 5/1994 | Japan . |
| 7-13132 | 1/1997 | Japan . |

Primary Examiner—Safet Metjahic
Assistant Examiner—John Chizmar
Attorney, Agent, or Firm—Greenblum & Bernstein, P.L.C.

[57] ABSTRACT

A voltage control device provided in an electro-developing type camera using an electro-developing recording medium by which an image is electronically developed. A first control electrode is provided on a portion corresponding to a first surface of the electro-developing recording medium. A second control electrode is provided on a portion corresponding to a second surface of the electro-developing recording medium. The second control electrode has rectangular first and second divided electrodes. The first divided electrode traverses the center portion of the electro-developing recording medium. The second divided electrode is positioned along a long side of the rectangle of the first divided electrode adjacent to the first divided electrode. An electric voltage is applied to the electro-developing recording medium through the first and/or second divided electrode.

8 Claims, 13 Drawing Sheets

|  | SW1 | SW2 | SW3 |
|---|---|---|---|
| NORMAL PH. MODE | ON | ON | ON |
| PANORAMIC PH. MODE | OFF | ON | OFF |

|  | SW1 | SW2 |
|---|---|---|
| NORMAL PH. MODE | ON | OFF |
| PANORAMIC PH. MODE | OFF | ON |

VOLTAGE CONTROL DEVICE

BACKGROUND OF THE INVENTION

1. Field of the Invention

The present invention relates to a recording medium in which an object image obtained through a photographing optical system is electronically developed, and more particularly, to a device for controlling the electric voltage applied to the recording medium.

2. Description of the Related Art

Conventionally, as disclosed in Japanese Unexamined Patent Publication No. 5-2280 and U.S. Pat. No. 5,424,156, there is known a photographic material which is directly and electronically developed so that the developed visible image can be immediately obtained. In this specification, such a recording medium is referred to as an electro-developing recording medium, and an electronic still camera using the electro-developing recording medium is referred to as an electro-developing type camera.

Japanese Unexamined Patent Publication Nos. 5-165005, 6-130347 and 7-13132 disclose an electro-developing recording medium which comprises a liquid crystal display having a memory-type liquid crystal so that an image indicated on the liquid crystal display is kept even if the electric field applied to the liquid crystal display is removed. JP '347 and JP '132 disclose an electro-developing recording medium in which the electrostatic information recording medium and the electric charge storage medium are combined to form one body. Namely, in these electro-developing recording mediums, even if an electric voltage applied thereto is removed, the image formed on the electro-developing recording medium is kept.

On the other hand, in a camera using an ordinary silver halide film, it is known that a so-called panoramic size image can be obtained by covering upper and lower portions of the film aperture of the camera.

If a panoramic size image is desired in the electro-developing type camera, it is possible to cover the upper and lower portions of the film aperture with plates, for example. Such a construction, however, makes the mechanical structure of the camera complex, and makes the camera bulky.

SUMMARY OF THE INVENTION

Therefore, an object of the present invention is to provide a voltage control device by which images having different sizes can be obtained by the electro-developing type camera without enlarging the electro-developing type camera.

According to the present invention, there is provided a voltage control device for an electro-developing recording medium in which an image formed thereon is electronically developed by applying an electric voltage thereto, the device comprising a first control electrode, a second control electrode, and an operating processor.

The first control electrode is provided at a portion corresponding to a first surface of the electro-developing recording medium. The second control electrode is provided at a portion corresponding to a second surface of the electro-developing recording medium. The second surface is opposite to the first surface. The operating processor operates the first and second control electrodes so that an electric voltage applied between the first and second control electrodes are controlled. At least one of the first and second control electrodes is divided into a plurality of divided parts including first and second divided electrodes.

Further, according to the present invention, there is provided a voltage control device for an electro-developing recording medium in which an image formed thereon is electronically developed by applying an electric voltage to the recording medium, where the device comprises a common electrode, first and second divided electrodes, and an operating processor.

The common electrode is provided at a portion corresponding to a first surface of the electro-developing recording medium. The first and second divided electrodes are provided at a portion corresponding to a second surface of the electro-developing recording medium. The second surface is opposite to the first surface. The operating processor operates the common electrode and the first and second control electrodes.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
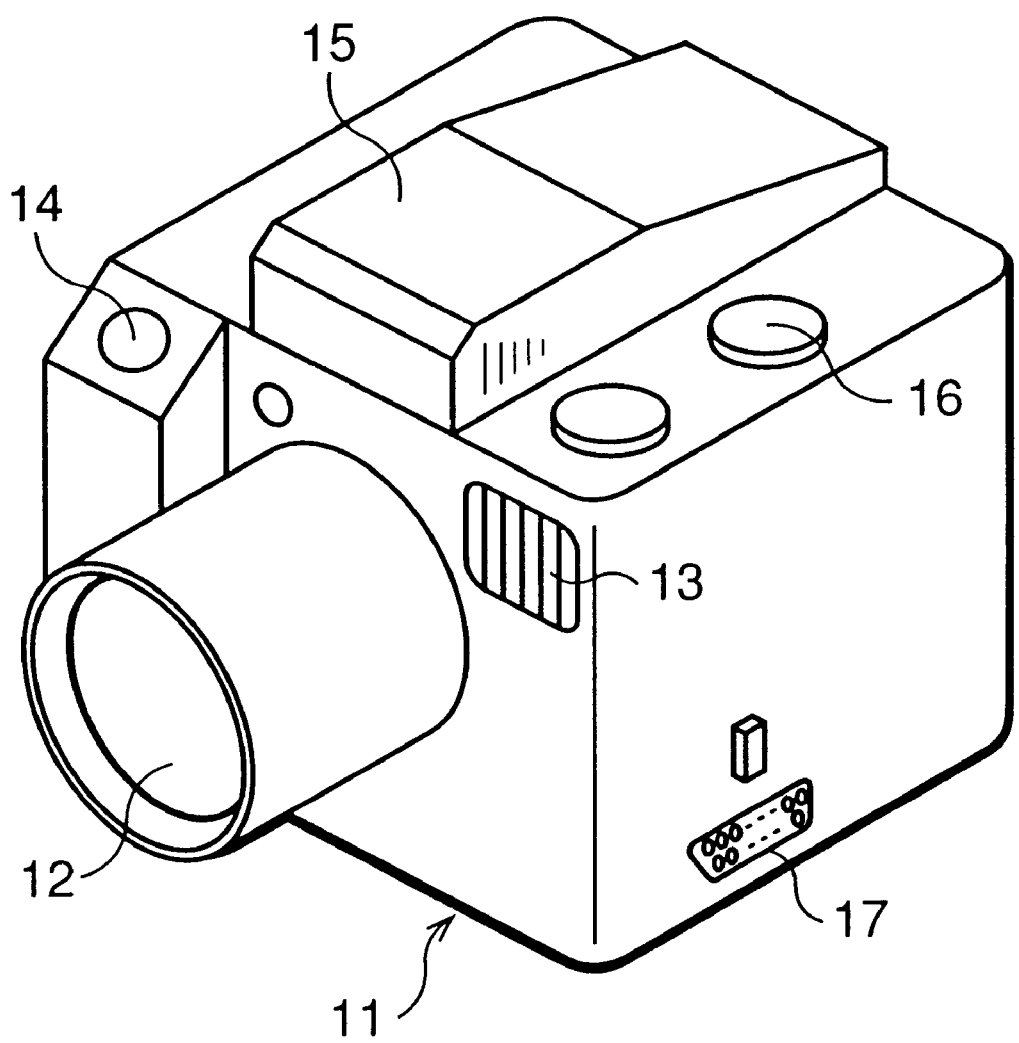
FIG. 1 is an external view showing an electro-developing type camera to which an embodiment of the present invention is applied.

FIG. 1 is an external view of an electro-developing type camera to which an embodiment according to the present invention is applied.

When viewing a camera body 11 from the front side, a photographing optical system 12 including a photographing lens system and so on is provided approximately at the center portion of the front surface of the camera body 11, and an electronic flash 13 is disposed to the right of and above the photographing optical system 12. A release switch 14 is provided on the side opposite to the electronic flash 13.

On the upper surface of the camera body 11, a view finder 15 is provided at the center portion and is extended from the front to the rear end of the camera body 11. A mode select switch 16 is provided on the upper surface and beside the view finder 15. An output terminal 17 is provided on a lower portion of a side surface of the camera body 11, so that an image signal obtained by this camera can be outputted to an external recording device (not shown).

Figure 2:
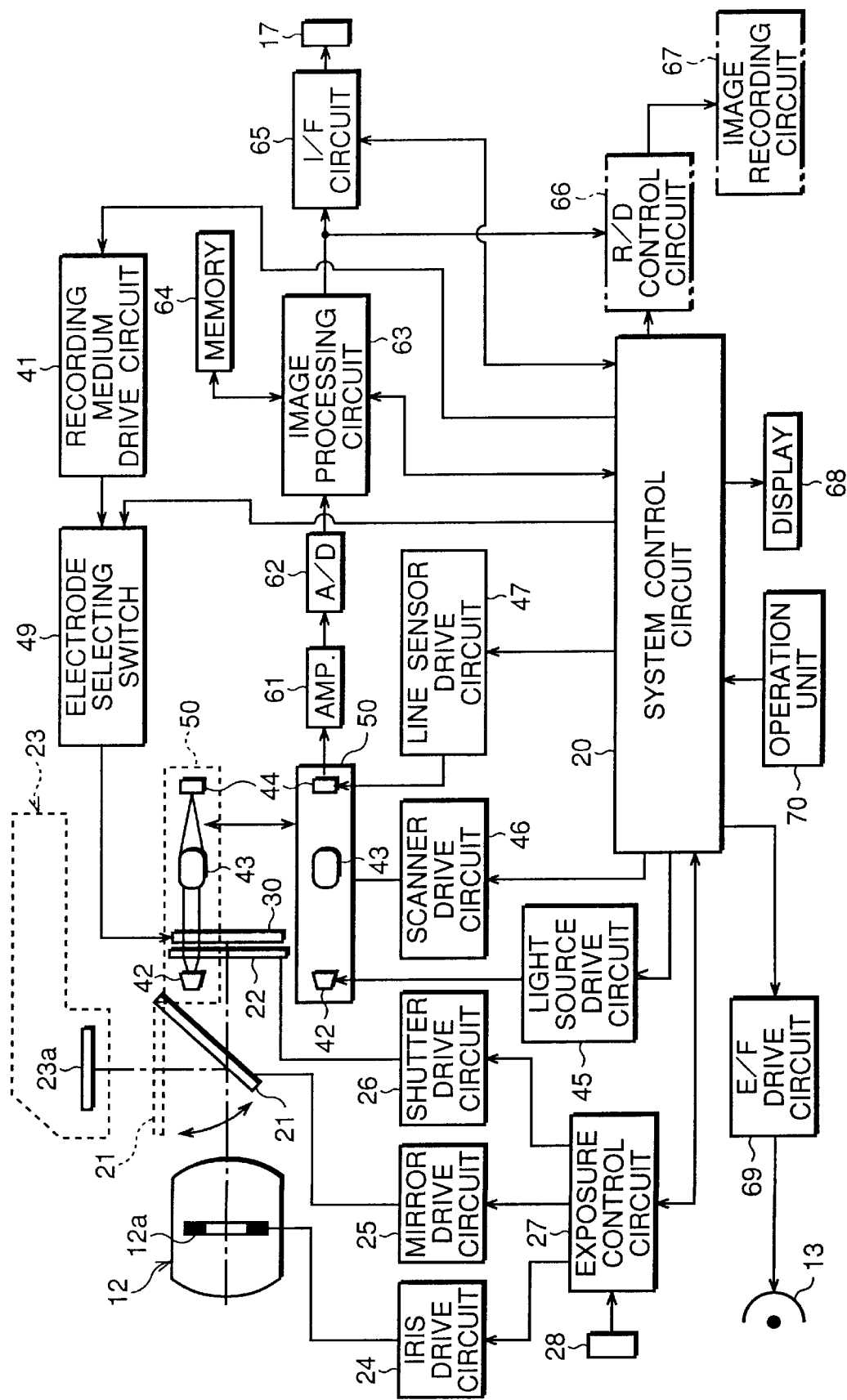
FIG. 2 is a block diagram of the electro-developing type camera shown in FIG. 1.

FIG. 2 is a block diagram of the electro-developing type camera, in which a system control circuit 20 including a microcomputer is mounted to control the electro-developing type camera as a whole.

The photographing optical system 12 has a plurality of lens groups and an aperture 12a. An electro-developing recording medium 30 is disposed behind the photographing optical system 12. A quick return mirror 21 is placed between the photographing optical system 12 and the electro-developing recording medium 30. A shutter 22 is provided between the quick return mirror 21 and the electro-developing recording medium 30. A focusing glass 23a included in a view finder optical system 23 is disposed above the quick return mirror 21.

The aperture 12a, the quick return mirror 21, and the shutter 22 are driven by an iris drive circuit 24, a mirror drive circuit 25, and a shutter drive circuit 26, respectively, which are controlled by an exposure control circuit 27.

The exposure control circuit 27 is operated in accordance with a command signal outputted by the system control circuit 20. Namely, when an exposure is controlled, the degree of opening of the aperture 12a is adjusted by the iris drive circuit 24 under control of the exposure control circuit 27 based on an output signal of a photometry sensor 28.

The quick return mirror 21 is usually set to a down position (an inclining position shown by the solid line in the drawing), so that a light beam passing through the photographing optical system 12 is directed to the view-finder optical system 23 to form an object image on the focusing glass 23a. Thus, an object to be photographed can be observed by the photographer through the finder optical system (not shown). When a photographing operation is carried out, the quick return mirror 21 is rotated upwards by the mirror drive circuit 25 and set to an up position (a horizontal position shown by the broken line in the drawing), so that the light beam is directed to the electro-developing recording medium 30.

The shutter 22 is usually closed, but upon a photographing operation, the shutter 22 is opened for a predetermined period by the shutter drive circuit 26 under the control of the exposure control circuit 27. Therefore, the light beam passing through the photographing optical system 12 enters a light receiving surface of the electro-developing recording medium 30, forming a two-dimensional image on the medium 30.

An electric voltage (i.e., a recording medium activating signal) is applied to the electro-developing recording medium 30 under the control of a recording medium drive circuit 41. By exposing the electro-developing recording medium 30 while applying the voltage, an image formed by the photographing optical system 12 is developed on the electro-developing recording medium 30 as a visible image. The electro-developing recording medium 30 has a plurality of electrodes by which electric voltages are applied thereto. An electrode selecting switch 49 is connected to the recording medium drive circuit 41 so that a predetermined electrode is selected from the plurality of electrodes. Namely, the recording medium drive circuit 41 is connected to the electro-developing recording medium 30 through the electrode selecting switch 49. Note that the recording medium drive circuit 41 and the electrode selecting switch 49 are operated in accordance with a command signal outputted by the system control circuit 20.

A scanning mechanism 50 is provided proximate to the electro-developing recording medium 30. A light source 42, a scanner optical system 43, and a line sensor 44 are supported by the scanning mechanism 50, and are moved along the electro-developing recording medium 30 by a scanning operation of the scanning mechanism 50.

The light source 42 has a plurality of LED (photodiodes), and can be moved along a front surface of the shutter 22 or the front surface of the electro-developing recording medium 30. The line sensor 44 may be a one-dimensional CCD sensor of 2000 pixels, for example. The line sensor 44 may be of suitable length to completely cover and extend over one horizontal scanning line of the image formed on the electro-developing recording medium 30. The line sensor 44 serves as a photoelectric-conversion device, which converts an optical image to an electric signal. The line sensor 44 can be moved along the rear surface of the electro-developing recording medium 30, together with the light source 42. The scanner optical system 43 is disposed between the light source 42 and the line sensor 44. When a scanning operation is carried out by the scanning mechanism 50, the scanner optical system 43 is positioned between the electro-developing recording medium 30 and the line sensor 44, so that the image developed by the electro-developing recording medium 30 is illuminated by the light source 42 and formed on the light receiving surface of the line sensor 44, through an operation of the scanner optical system 43.

Control of the light source 42 (i.e., turning the light source 42 ON and OFF) is performed by a light source drive circuit 45. Control of the reading operation of pixel signals generated in the line sensor 44 is carried out by a line sensor drive circuit 47. Control of the movement of the scanning mechanism 50 is performed by a scanner drive circuit 46. The circuits 45, 46, and 47 are controlled by the system control circuit 20.

Pixel signals read out from the line sensor 44 are amplified by an amplifier 61, and converted to a digital signal by an A/D converter 62. The digital pixel signals are subjected to a shading correction, a gamma correction, and so on by an image processing circuit 63 under the control of the system control circuit 20, and then temporarily stored in a memory 64. The memory 64 includes an EEPROM in which correction data for the shading correction are stored. Note that the memory 64 may have a storage capacity equal to one horizontal scanning line outputted from the line sensor 44, or may have a storage capacity of one frame's worth pixel signals.

The pixel signals read from the memory 64 are inputted to an interface circuit 65 through the image processing circuit 63, so that the pixel signals are subjected to a predetermined process such as a format conversion, and can then be outputted to an external computer (not shown) through the output terminal 17. The pixel signals outputted from the image process circuit 63 are subjected to a predetermined process such as an image compression and a format conversion in a recording device control circuit 66, so that the pixel signals can be recorded on a recording medium such as an IC memory card, for example, in an image recording device 67. The interface circuit 65 and the recording device control circuit 66 are operated in accordance with a command signal outputted from the system control circuit 20.

An operation unit 70 including the release switch 14 and the mode select switch 16 is connected to the system control circuit 20. In accordance with operations of the release switch 14 and the mode select switch 16, one of the following operations will occur: a normal photography mode or a panoramic photography mode is selected, a recording operation, in which an image is recorded on the electro-developing recording medium 30 is recorded is performed, or a reading operation in which the image is read from the electro-developing recording medium 30 is performed. A display device 68 is connected to the system control circuit 20 to indicate various setting conditions of the electro-developing type camera. Further, an electric flash drive circuit 69 is connected to the system control circuit 20 to control the flash operation of the electronic flash 13.

When reading of an image from the electro-developing recording medium 30 is not performed, the scanning mechanism 50 is in a position offset from a path between the photographing optical system 12 and the electro-developing recording medium 30. This position of the scanning mechanism 50 is below the electro-developing recording medium 30, for example. When an image recorded on the electro-developing recording medium 30 is read, a scan drive motor included in the scanner drive circuit 46 is rotated, and the scanning mechanism 50 is moved upward so that a scan of the line sensor 44 is carried out. The line sensor 44 is moved in a direction perpendicular to the longitudinal direction of the line sensor 44.

Figure 3:
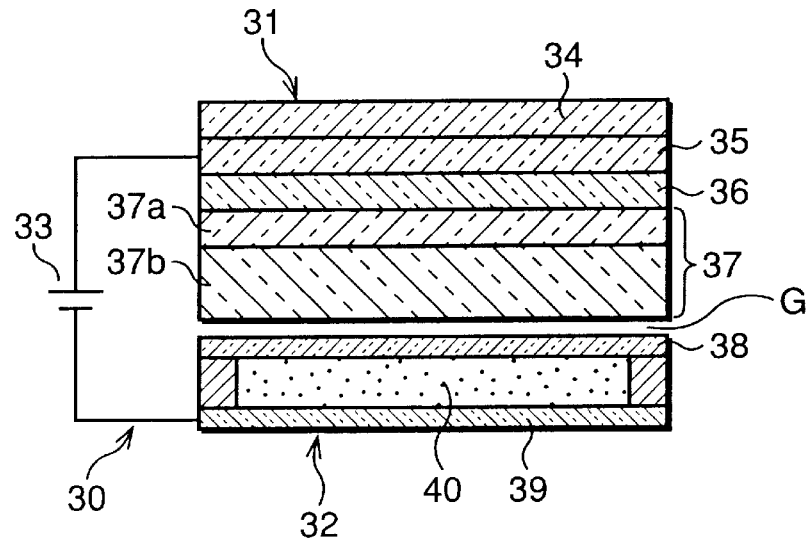
FIG. 3 is a sectional view showing a first example of a structure of an electro-developing recording medium.

FIG. 3 shows a first example of a structure of the electro-developing recording medium 30, and is the same as that shown in Japanese Unexamined Patent Publication No. 5-2280.

The electro-developing recording medium 30 has an electrostatic information recording medium 31 and an electric charge storage medium 32, and an electric voltage is applied thereto by an electric power source 33. The electrostatic information recording medium 31 is formed by laminating a glass base plate 34, an electrode layer 35, an inorganic oxide material layer 36 and a photoconducting layer 37, and the photoconducting layer 37 is formed by laminating an electric charge generating layer 37a and an electric charge transferring layer 37b. The electric charge storage medium 32 is formed by confining liquid crystal 40, which is a smectic liquid crystal, between a liquid crystal supporting plate 38 and a liquid crystal electrode layer 39. The electric charge transferring layer 37b of the photoconducting layer 37 and the liquid crystal supporting plate 38 of the electric charge storage medium 32 face each other with a small gap G therebetween.

The electric power source 33 is controlled (i.e., turned ON or OFF) by the recording medium drive circuit 41 (see FIG. 2). When the electric power source 33 is turned ON, an electric voltage is applied between the electrode layer 35 and the liquid crystal electrode layer 39, i.e., between the electrostatic information recording medium 31 and the electric charge storage medium 32. When the electrostatic information recording medium 31 is exposed while the electric voltage is applied, an electric charge is generated in the electrostatic information recording medium 31 in accordance with an image formed thereon. Since the intensity of the electric field applied to the liquid crystal 40 is changed in accordance with the electric charge, the image is indicated on the liquid crystal 40 as a visible image. Thus, an image of an object is developed. Namely, the visible image is generated in accordance with the electric charge.

The electric charge storage medium 32 is a liquid crystal display having a memory-type liquid crystal such as a smectic liquid crystal, and thus, the developed visible image is retained even if the electric field is removed. In the liquid crystal, the developed visible image can be erased by heating the liquid crystal, using a heating device (not shown) at a predetermined temperature. In such a case, the same electric charge storage medium 32 can be used repeatedly.

Figure 4:
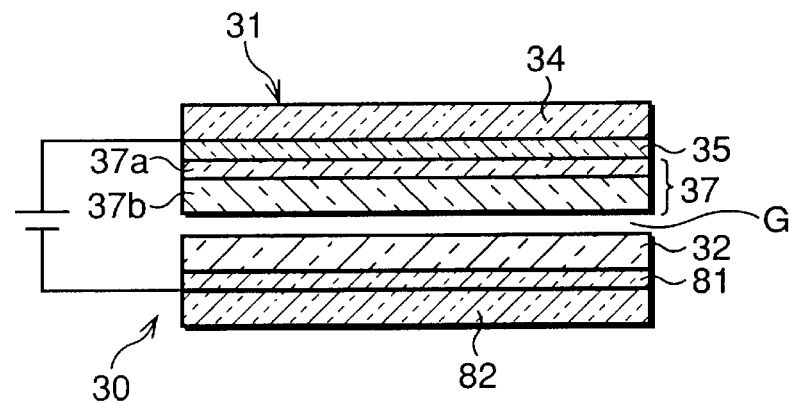
FIG. 4 is a sectional view showing a second example of a structure of the electro-developing recording medium.

FIG. 4 shows a second example of a structure of the electro-developing recording medium 30, and is the same as that shown in Japanese Unexamined Patent Publication No. 5-165005.

The electrostatic information recording medium 31 is formed by laminating the base plate 34, the electrode layer 35 and the photoconducting layer 37, and the photoconducting layer 37 is formed by laminating the electric charge generating layer 37a and the electric charge transferring layer 37b. The electric charge storage medium 32 is a liquid crystal display having a memory-type liquid crystal such as a smectic liquid crystal, and faces the photoconducting layer 37 with a small gap G therebetween. An electrode layer 81 and a base plate 82 are laminated on a surface of the electric charge storage medium 32, which surface is opposite to the electrostatic information recording medium 31. The other structures are the same as those shown in FIG. 3.

Figure 5:
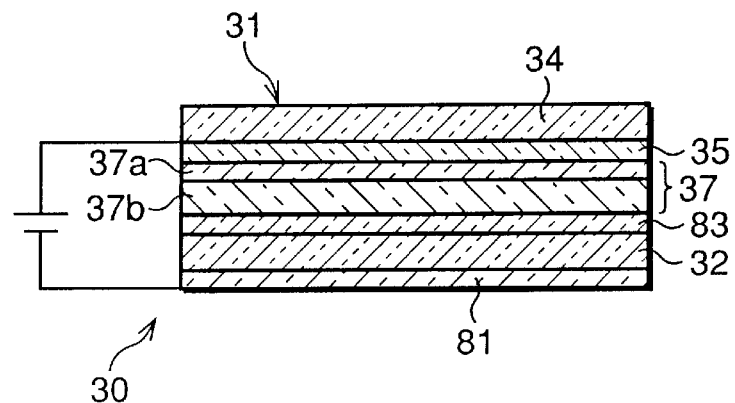
FIG. 5 is a sectional view showing a third example of a structure of the electro-developing recording medium.

FIG. 5 shows a third example of a structure of the electro-developing recording medium 30, and is the same as that shown in Japanese Unexamined Patent Publication Nos. 6-130347 and 7-13132.

This electro-developing recording medium 30 is of a uni-body type. In the electro-developing recording medium 30, an insulating layer 83 is provided between the electric charge transferring layer 37b of the electrostatic information recording medium 31 and the electric charge storage medium 32 which is a liquid crystal display having a memory-type liquid crystal such as a smectic liquid crystal, and an electrode layer 81 is laminated on a surface of the electric charge storage medium 32 which surface is opposite to the electrostatic information recording medium 31. The other structures are the same as those shown in FIG. 4. Namely, no gap is formed between the electrostatic information recording medium 31 and the electric charge storage medium 32.

The electro-developing recording media 30 shown in FIGS. 3 through 5 can be used in the still video camera having an electric circuit shown in FIG. 1. The following description assumes that the still video camera is provided with the electro-developing recording medium 30 shown in FIG. 3.

Figure 6:
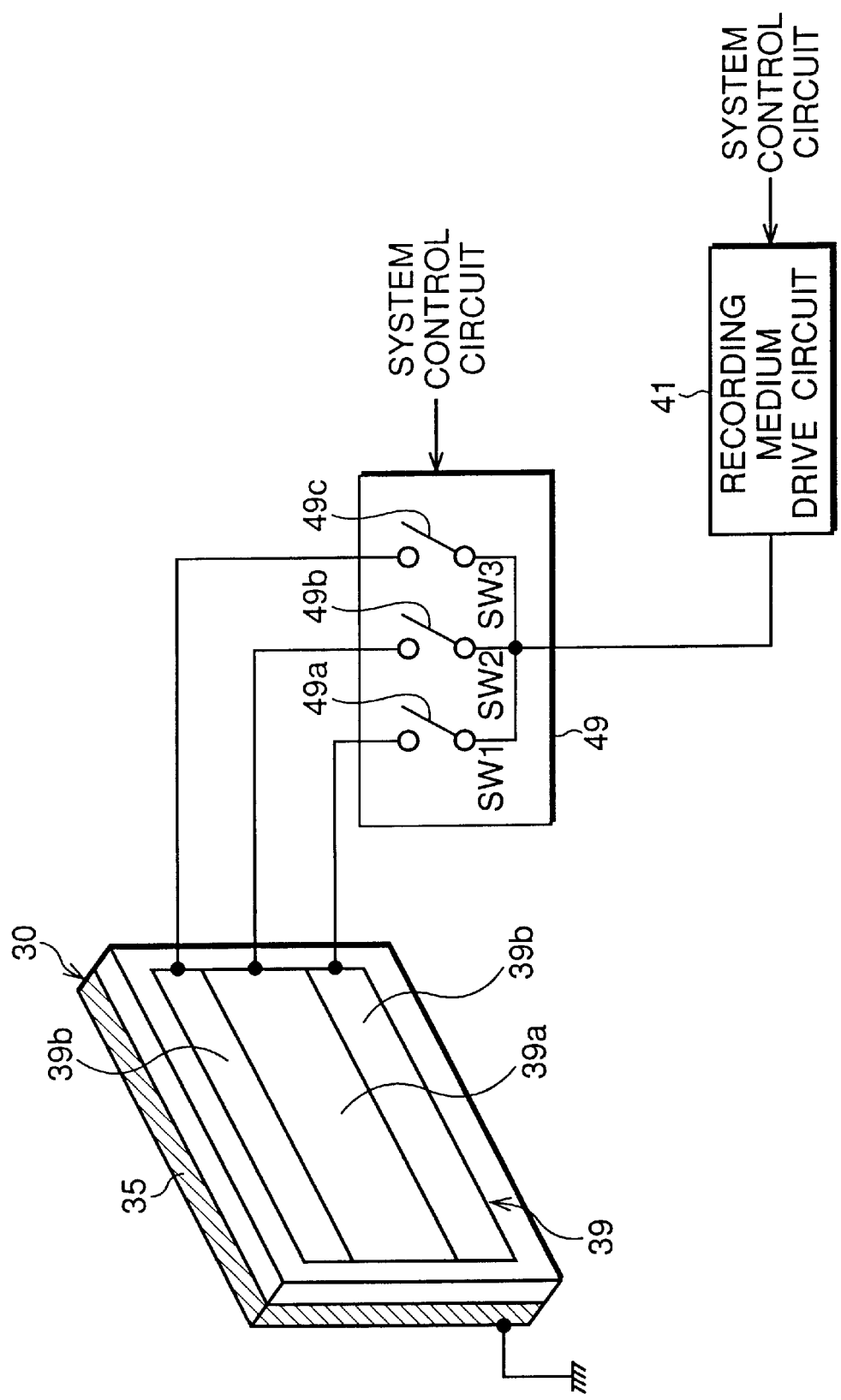
FIG. 6 is a schematic view showing a connection relationship among the electro-developing recording medium, an electrode select switch, and a recording medium drive circuit.
Figures 7, 8:
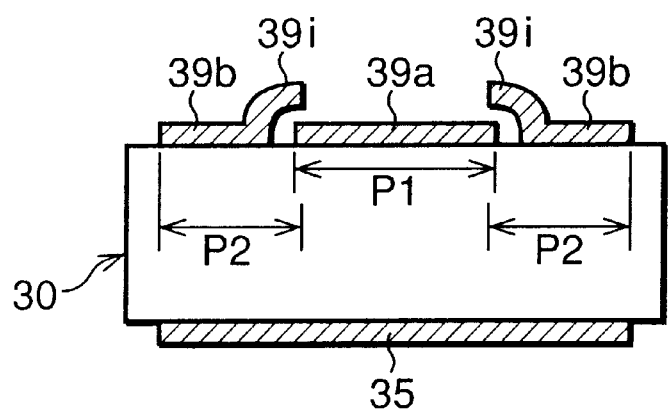
FIG. 7 is a table showing combinations of states of the electrode select switch.
FIG. 8 is a sectional view showing a construction of each of the electrodes provided on the electro-developing recording medium.

FIG. 6 shows a connection relationship among the electro-developing recording medium 30, the electrode select switch 49, and the recording medium drive circuit 41. FIG. 7 shows states of the electrode select switch 49.

As shown in FIG. 6, a first control electrode 35 (i.e., the electrode layer 35 of FIG. 3) is provided on a surface of the electro-developing recording medium 30, and a second control electrode 39 (i.e., the liquid crystal electrode layer 39 of FIG. 3) is provided on the other surface of the electro-developing recording medium 30. The first control electrode 35 covers approximately the entire surface of the electro-developing recording medium 30. The second control electrode 39 is divided into a plurality of parts, which are first and second divided electrodes 39a and 39b, respectively. The first divided electrode 39a is rectangular, and traverses the central portion of the surface of the electro-developing recording medium 30 in the longitudinal direction thereof. The second divided electrodes 39b are positioned adjacent to a pair of the lengths of the rectangle of the first divided electrode.

The electrode select switch 49 has first, second, and third switches 49a, 49b, and 49c. The recording medium activating signal outputted from the recording medium drive circuit 41 is supplied to the entire part or partly to the first and second divided electrodes 39a and 39b through either one of the switches 49a, 49b, and 49c. The first control electrode 35 is a common electrode, and is grounded.

When the normal photography mode is set by the mode select switch 16, all of the three switches 49a through 49c are turned ON, so that the recording medium activating signal outputted by the recording medium drive circuit 41 is supplied to the first and second divided electrodes 39a and 39b. Therefore, an electric voltage is applied to almost the entire electro-developing recording medium 30, and thus, an image is recorded on a recording area which has a shape corresponding to the divided electrodes 39a and 39b.

Conversely, when the panoramic photography mode is set by the mode select switch 16, only the second switch 49b is turned ON, and the first and third switches 49a and 49c are turned OFF. Namely, the recording medium activating signal is supplied only to the first divided electrode 39a. Therefore, an electric voltage is applied only to a portion corresponding to the first divided electrode 39a. Thus, an image is recorded on a narrower recording area corresponding to the divided electrode 39a.

FIG. 8 is a sectional view showing a construction of each of the electrodes provided on the electro-developing recording medium 30. While all of the rear surface of the first divided electrode 39a is attached to a surface of the electro-developing recording medium 30, a portion 39i on each of the second divided electrodes 39b is detached from the electro-developing recording medium 30, to cover the side borders of the first divided electrode 39a. Namely, while the first divided electrode 39a is provided to a first portion P1 of the electro-developing recording medium 30, the second electrode 39b is provided to a second portion P2 of the electro-developing recording medium 30, and the first and second portions P1 and P2 slightly overlap with one another. Due to this construction, an unrecorded area will not exist between a first recording area corresponding to the first divided electrode 39a and a second recording area corresponding to the second divided electrode 39b, in a normal photography mode.

Figure 9:
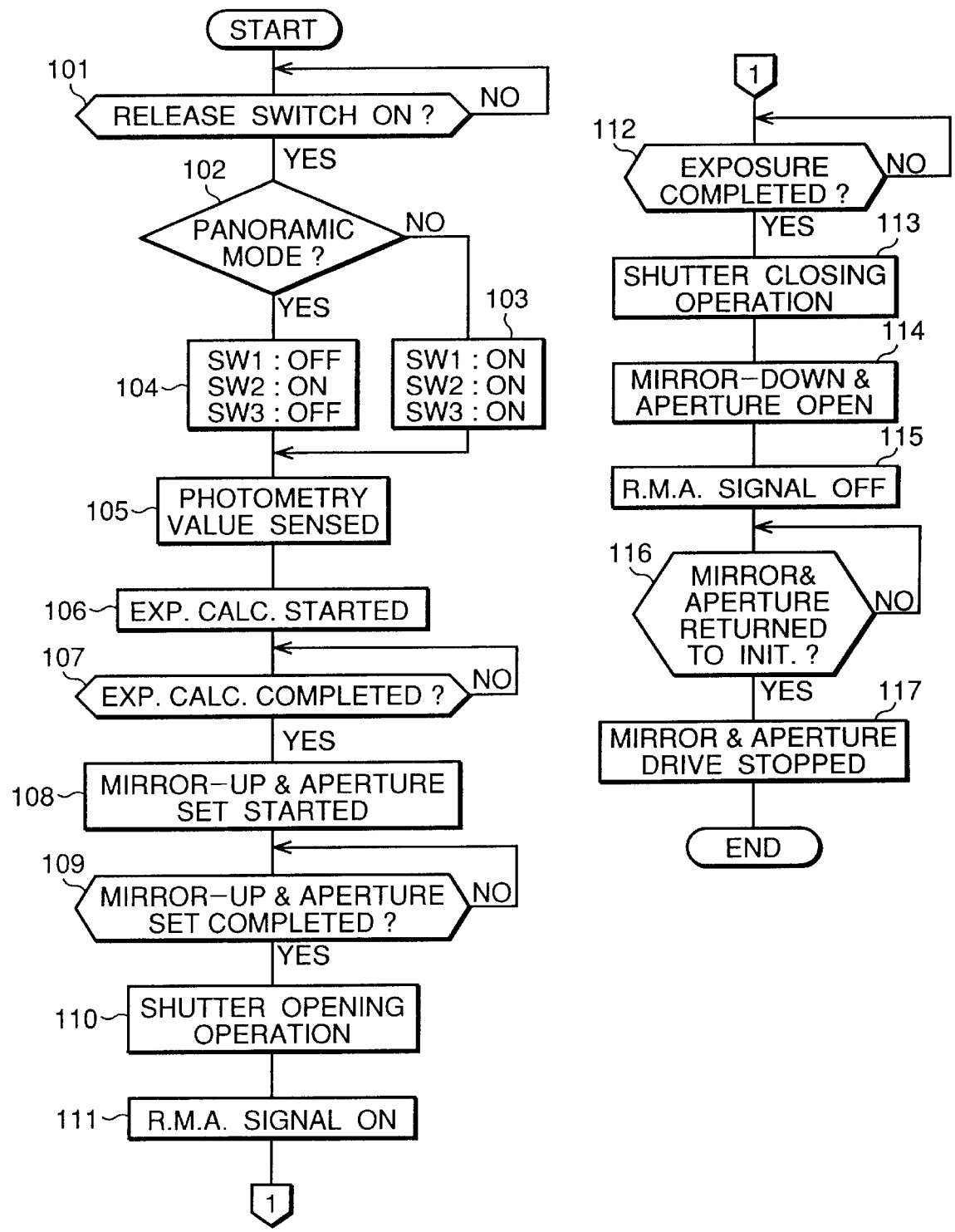
FIG. 9 is a flow chart of a program for a recording operation in which an image is recorded on the electro-developing recording medium.

FIG. 9 is a flow chart of a program for a recording operation in which an image is recorded on the electro-developing recording medium 30.

When it is confirmed in Step 101 that the release switch 14 has been depressed, it is determined in Step 102 whether or not the panoramic photography mode has been set by the mode select switch 16. When the normal photography mode has been set, Step 103 is executed so that the first through third switches 49a, 49b, and 49c are turned ON. When the panoramic photography mode has been set, Step 104 is executed so that the second switch 49b is turned ON, and the first and third switches 49a and 49c are turned OFF.

In Step 105, an output signal from the photometry sensor 28, i.e., a photometry value, is sensed. Then, in Step 106, an exposure calculation is initiated based on the photometry value. When the completion of the exposure calculation is confirmed in Step 107, the recording operation is performed in Step 108 and the remaining Steps in accordance with the calculation results.

In Step 108, the degree of opening of the aperture 12a is adjusted from the fully open state to a predetermined degree of opening, and the quick return mirror 21 is changed from the down position to the up position. Upon confirmation in Step 109 that the quick return mirror 21 has been changed to the up position and the adjustment of degree of opening the aperture 12a has been completed, the shutter 22 is opened in Step 110. A recording medium activating signal is outputted in Step 111, so that an electric voltage is applied to the electro-developing recording medium 30. When the exposure time obtained based on the exposure calculation has elapsed and it is confirmed in Step 112 that the exposure has been completed, the shutter 22 is closed in Step 113. With the completion of the closing operation of the shutter 22, Step 114 is executed so that a rotation of the mirror 21 to the down position is started and a return to a fully open state of the aperture 12a is started. In Step 115, the output of the recording medium activating signal is stopped.

Thus, the recording medium activating signal is continuously outputted at least while the shutter 22 is open, and during this period, a predetermined voltage is applied to the electro-developing recording medium 30. By exposing the electro-developing recording medium 30 under this condition, the object image is developed on the electro-developing recording medium 30 as a visible image, which is held on the electro-developing recording medium 30 even after the output of the recording medium activating signal is stopped.

When it is confirmed in Step 116 that the mirror 21 and the aperture 12a have returned to the initial conditions thereof, respectively, the operations of the mirror 21 and the aperture 12a are stopped in Step 117, and thus, this program ends.

As described above, in this embodiment, the first divided electrode 39a is provided to traverse the central portion of the surface of the electro-developing recording medium 30 in the longitudinal direction thereof, and the second divided electrodes 39b are positioned adjacent to a pair of long sides of the rectangle of the first divided electrode 39a. Further, in the embodiment, the divided electrodes 39a and/or 39b are activated by the electrode select switch 49, so that either the normal photography mode or the panoramic photography mode is selected. Namely, in the normal photography mode, both of the first and second divided electrodes 39a and 39b are activated, so that an image is developed in whole of the recording area of the electro-developing recording medium 30. In the panoramic photography mode, only the first divided electrodes 39a is activated and the second divided electrodes 39b are suspended, so that an image is developed only in a portion corresponding to the first divided electrode 39a to obtain a panoramic image.

Thus, the select between the normal photography mode and the panoramic photography mode is carried out by an ON-OFF control of the electrodes 39a and 39b. Therefore, in comparison with a camera in which the upper and lower portions of the film aperture are covered with plates to obtain a panoramic image, according to the embodiment, a mechanical structure of the camera is simplified, and the camera body is prevented from being bulky.

Figure 10:
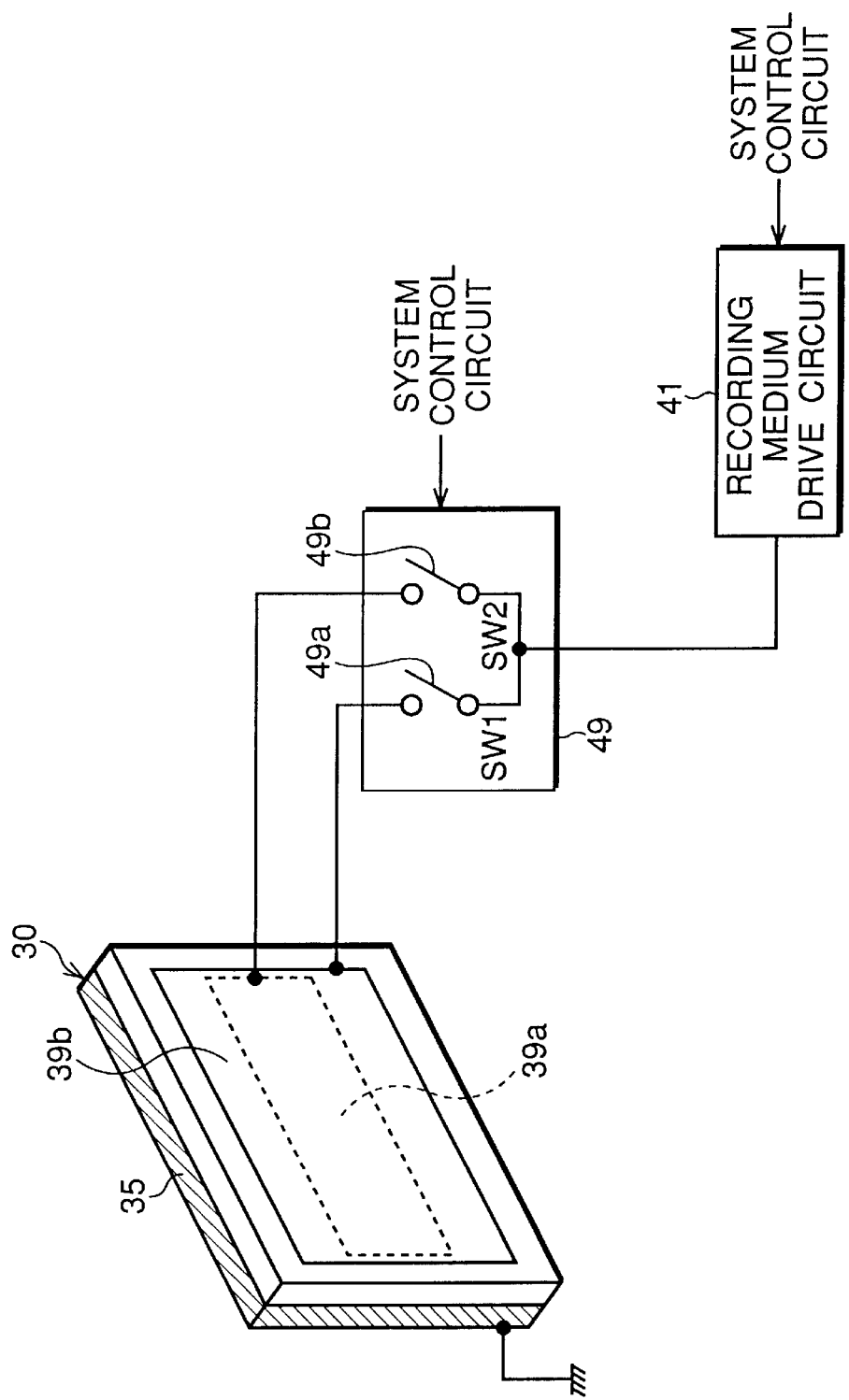
FIG. 10 is a schematic view showing a connection relationship among the electro-developing recording medium, the electrode select switch, and the recording medium drive circuit, in a second embodiment.
Figures 11, 12:
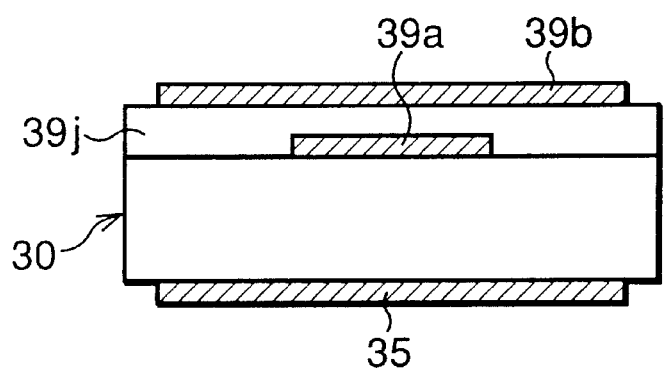
FIG. 11 is a table showing combinations of states of the electrode select switch of the second embodiment.
FIG. 12 is a sectional view showing a construction of each of the electrodes provided on the electro-developing recording medium of the second embodiment.

FIGS. 10, 11, and 12 show a second embodiment, in which constructions are the same as those of the first embodiment, except those shown in FIGS. 10 and 12. FIG. 10 shows a connection relationship among the electro-developing recording medium 30, the electrode select switch 49, and the recording medium drive circuit 41. FIG. 11 shows states of the electrode select switch 49. FIG. 12 shows is a sectional view showing a construction of each of the electrodes provided on the electro-developing recording medium 30.

As understood from FIGS. 10 and 12, in the second embodiment, the first divided electrode 39a is rectangular, and traverses the central portion of the surface of the electro-developing recording medium 30 in the longitudinal direction thereof, and the second divided electrode 39b is provided on almost the entire surface of the electro-developing recording medium 30. A portion between the first and second divided electrodes 39a and 39b is electrically isolated by an isolating layer 39j.

The electrode select switch 49 has first and second switches 49a and 49b. In the normal photography mode, only the first switch 49a is turned ON, and in the panoramic photography mode, only the second switch 49b is turned ON. Namely, in the normal photography mode, an electric voltage is applied to the entire electro-developing recording medium 30 through the second divided electrode 39b, so that an image having the normal aspect ratio is recorded in the electro-developing recording medium 30. In the panoramic photography mode, an electric voltage is applied to a relatively narrow portion of the electro-developing recording medium 30 through the first divided electrode 39a, so that a panoramic image is recorded in the relatively slender recording area of the electro-developing recording medium 30.

Figure 13:
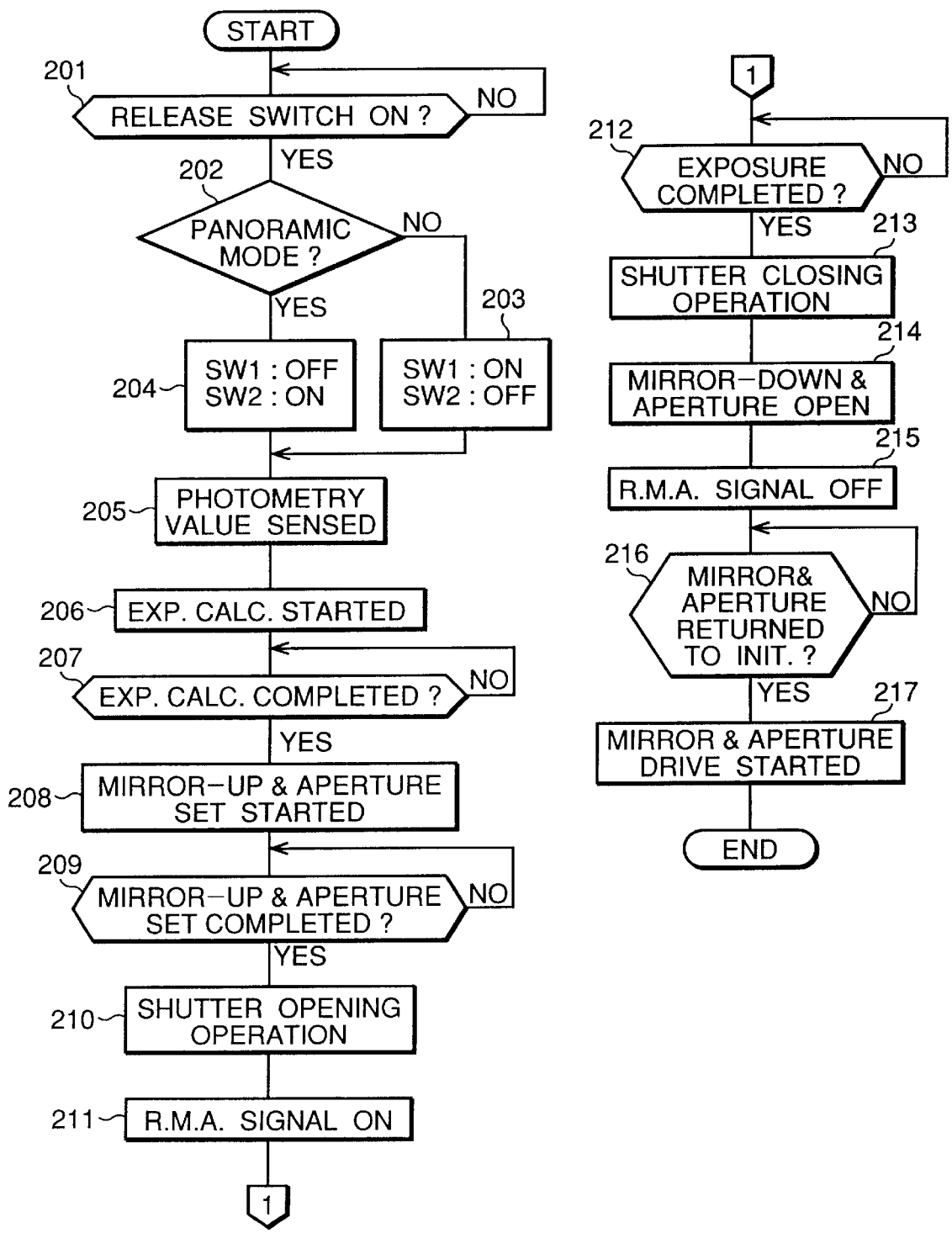
FIG. 13 is a flow chart of a program for a recording operation in the second embodiment.

FIG. 13 is a flow chart of a program for a recording operation in the second embodiment. This flow chart corresponds to the same steps as FIG. 9, and "100" has been added to the numerical Steps to indicate the difference. For example, Step 201 of FIG. 13 corresponds to Step 101 of FIG. 9.

When it is confirmed in Step 201 that the release switch 14 has been depressed, it is determined in Step 202 whether or not the panoramic photography mode has been set by the mode select switch 16. When the normal photography mode has been set, Step 203 is executed so that the first switch 49a is turned ON and the second switch 49b is turned OFF. When the panoramic photography mode has been set, Step 204 is executed so that the first switch 49a is turned OFF, and the second switch 49b is turned ON.

The contents of Steps 205 through 217 are the same as those of Steps 105 through 117 of FIG. 9.

According to the second embodiment, similar to the first embodiment, the selection between the normal photography mode and the panoramic photography mode is carried out by an ON-OFF control of the electrodes 39a and 39b. Accordingly, the same effect as the first embodiment can be obtained.

Figure 14:
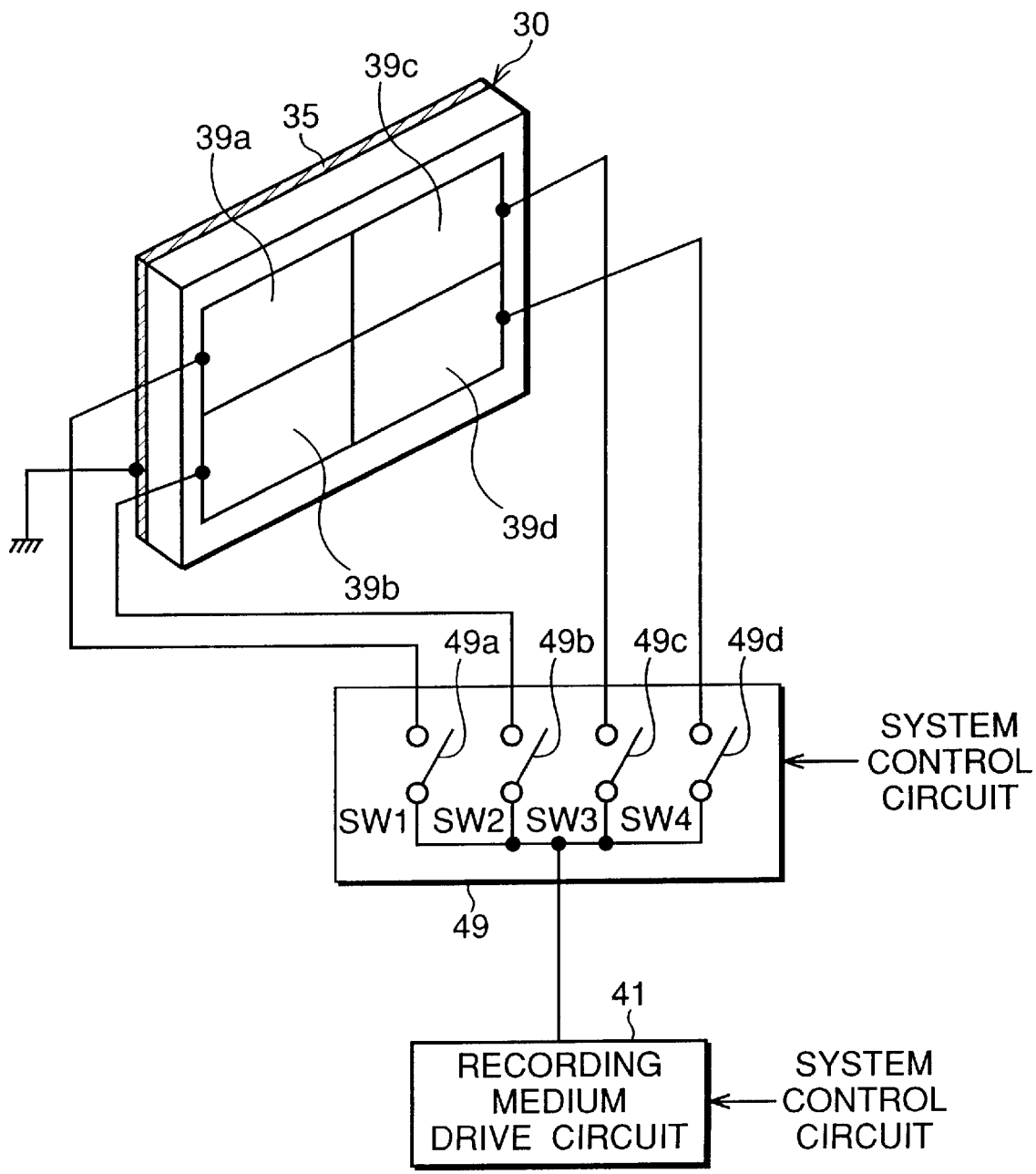
FIG. 14 is a schematic view showing a connection relationship among the electro-developing recording medium, the electrode select switch, and the recording medium drive circuit, in a third embodiment.

FIG. 14 is a schematic view showing a connection relationship among the electro-developing recording medium 30, the electrode select switch 49, and the recording medium drive circuit 41, in a third embodiment, in which constructions are the same as those of the first embodiment, except those shown in FIG. 14.

In the third embodiment, the first through fourth divided electrodes 39a, 39b, 39c, and 39d are identical rectangles.

The first and second divided electrodes 39a and 39b are positioned in such a manner that they are one on top of the other. The third and fourth divided electrodes 39c and 39d are also positioned in such a manner that one lies on top of the other. The first and third divided electrodes 39a and 39c are positioned in such a manner that they are next to each other. The second and fourth divided electrodes 39b and 39d are also positioned in such a manner that they lie next to one another. Namely, the third embodiment is not provided for performing the panoramic photography mode, but has a construction by which a multi photography mode, in which a plurality of images can be recorded on the single electro-developing recording medium 30, can be carried out.

The electrode select switch 49 has first through fourth switches 49a, 49b, 49c, and 49d, where either one or all are turned ON. For example, when only the first switch 49a is turned ON, an image is developed in a portion corresponding to the divided electrode 39a to which the switch 49a is connected. Namely, the multi photography mode, in which four images can be recorded on the single electro-developing recording medium 30, is carried out. Conversely, when all of the switches 49a through 49d are turned ON, an image which is larger than that obtained by the multi photography mode is developed in a portion corresponding to the divided electrodes 39a, 39b, 39c, and 39d.

Figure 15:
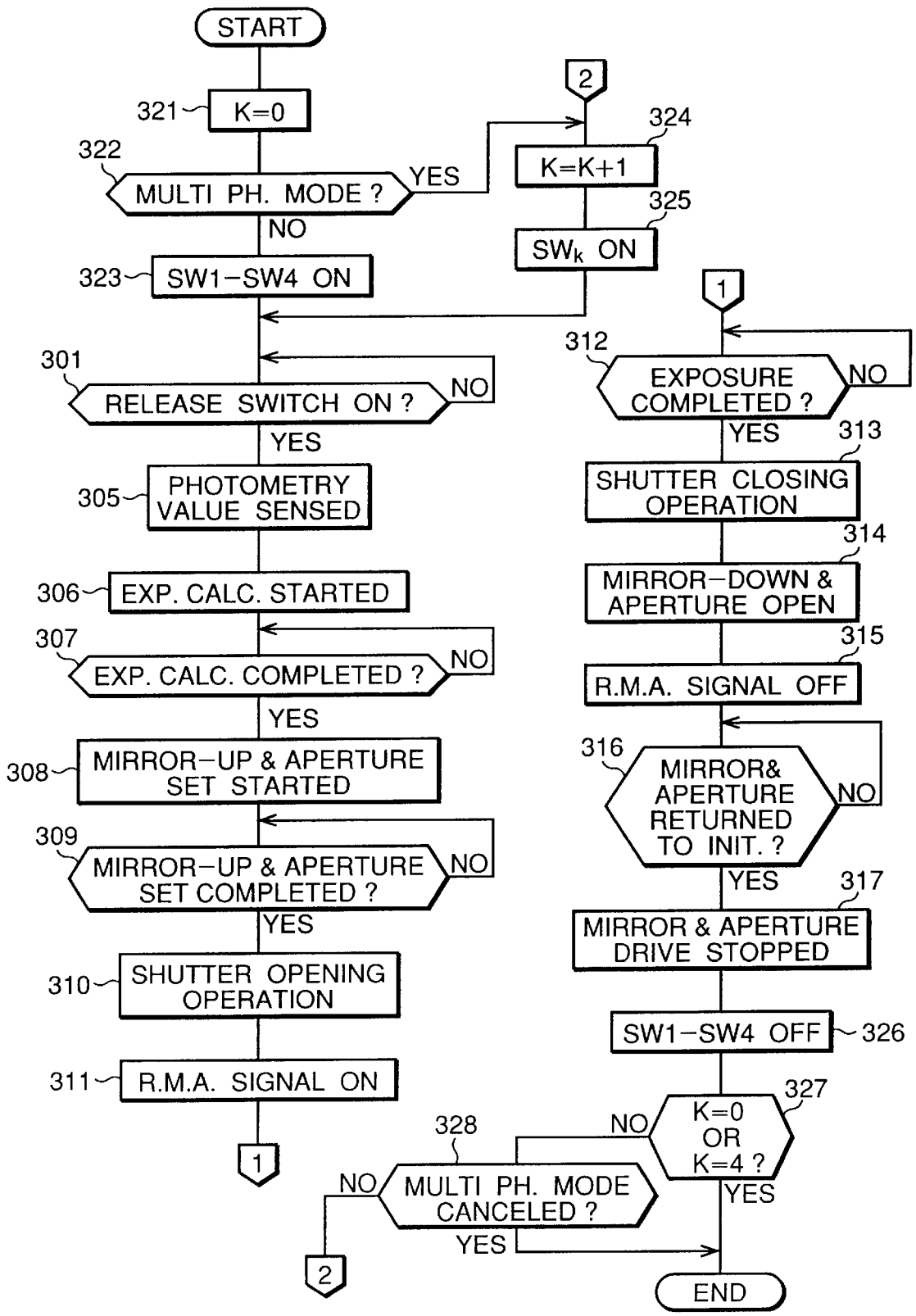
FIG. 15 is a flow chart of a program for a recording operation in the third embodiment.

FIG. 15 is a flow chart of a program for a recording operation in the third embodiment. In this flow chart, similarly to the flow chart shown in FIG. 13, "200" is added to the numerals indicating Steps corresponding to the Steps shown in FIG. 9.

In Step 321, a parameter K is reset to 0. In Step 322, it is determined whether the multi photography mode has been set by the mode select switch 16. When the multi photography mode has not been set, Step 323 is executed in which the switches 49a, 49b, 49c, and 49d are turned ON. Namely, the setting for a single image to be recorded on the electro-developing recording medium 30 is set. Conversely, when the multi photography mode has been set, the parameter K is increased by 1 in Step 324, and one of the switches 49a, 49b, 49c, or 49d is turned ON in Step 325.

When it is confirmed in Step 301 that the release switch 14 has been depressed, an output signal from the photometry sensor 28, i.e., a photometry value, is sensed in Step 305. The contents of Steps 306 through 317 are the same as those of Steps 106 through 117 of FIG. 9.

The operations of the mirror 21 and the aperture 12a are stopped in Step 317, and then, all of the switches 49a, 49b, 49c, and 49d are turned OFF in Step 326. In Step 327, it is determined whether the parameter K is 0 or 4. When the parameter K is neither 0 nor 4, it is determined in Step 328 whether the mode select switch 16 is operated so that the multi photography mode has been cancelled. When the multi photography mode has not been cancelled, the process returned to Step 324, in which the parameter K is increased by 1, and thus, a recording operation for the next image is performed.

When it is determined in Step 327 that the parameter is 0 or 4, and when it is determined in Step 328 that the multi photography mode has been cancelled, this program ends.

Thus, according to the third embodiment, the select between the normal photography mode and the multi photography mode is carried out by an ON-OFF control of the electrodes 39a through 39d. Namely, according to the third embodiment, similarly to the first and second embodiments, a portion of the electro-developing recording medium 30 in which an image is recorded, can be controlled with a simple construction. Note that, in the multi photography mode, for leading an image obtained through the photographing optical system 12 onto each portion of the electro-developing recording medium 30, a prism may be provided between the photographing optical system 12 and the electro-developing recording medium 30, and the position of the prism may be switched in accordance with the operation of the mode select switch 16.

Figure 16:
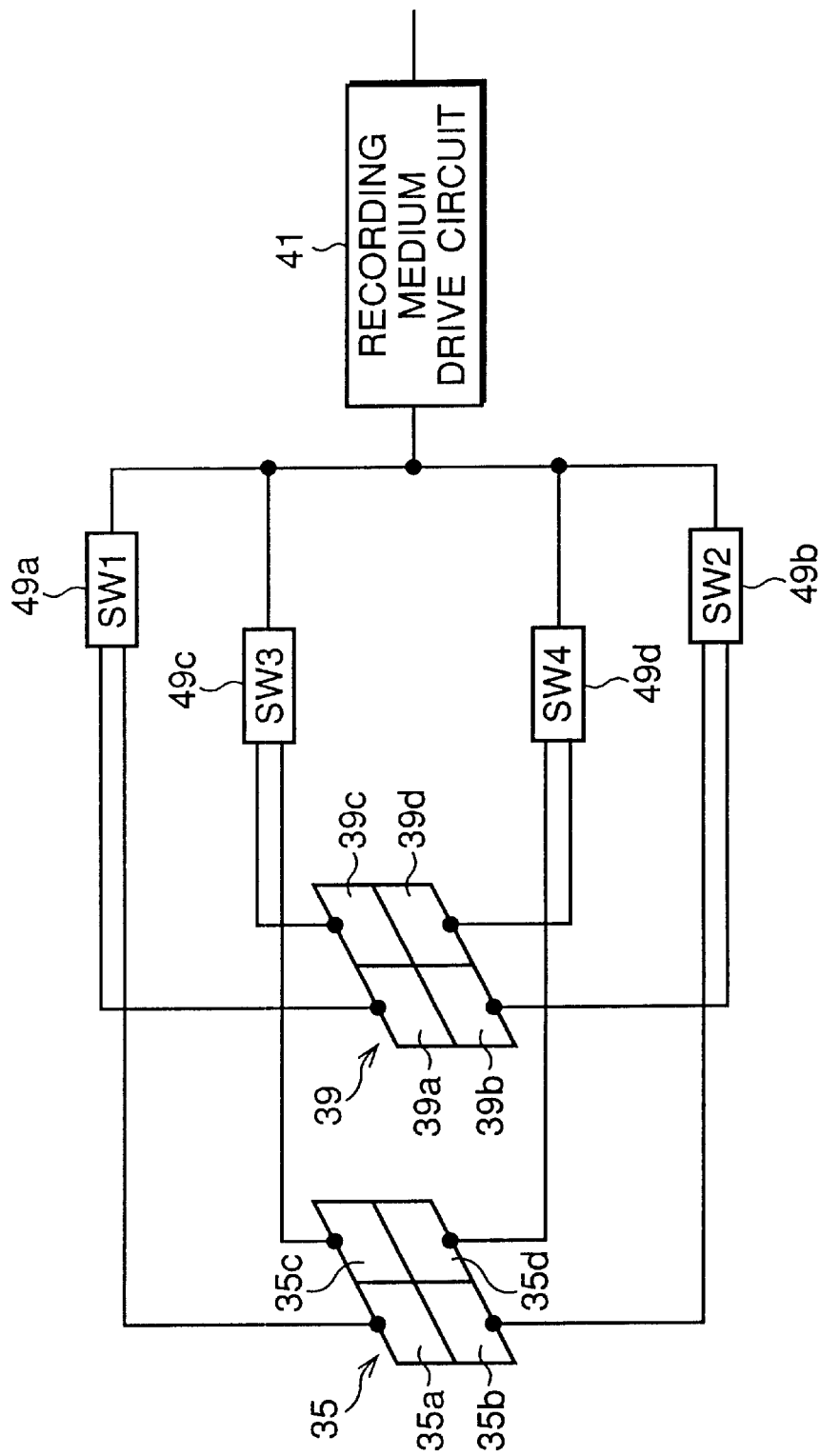
FIG. 16 is a schematic view showing a connection relationship among first and second control electrodes and the electrode select switch in a fourth embodiment.
Figure 17:
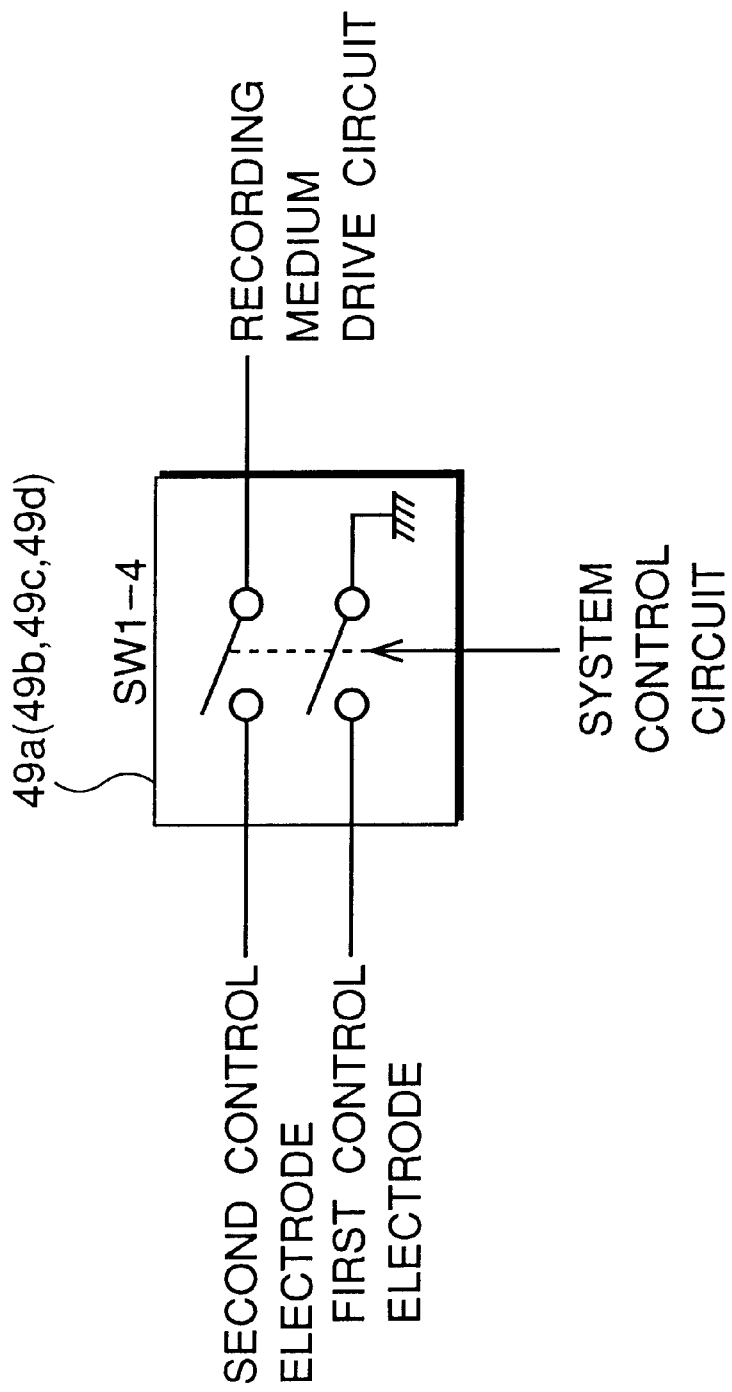
FIG. 17 is a schematic view showing a construction of the electrode select switch in the fourth embodiment.

FIGS. 16 and 17 show constructions of the first and second control electrodes 35 and 39 and the electrode select switch 49, in a fourth embodiment. Constructions except those shown in FIGS. 16 and 17 are the same as those of the first embodiment.

In the fourth embodiment, the second control electrode 39 is divided into four equally divided electrodes 39a, 39b, 39c, and 39d, and the first control electrode 35 is also divided into four equally divided electrodes 35a, 35b, 35c, and 35d. The electrode select switch has the first through fourth switches 49a, 49b, 49c, and 49d. For example, when the first switch 49a is turned ON, an electric voltage is applied to each of the divided electrode 35a of the first control electrode 35 and the divided electrode 39a of the second control electrode 39, so that an image is recorded in the corresponding recording area. Namely, by selectively turning ON and OFF each of the switches 49a, 49b, 49c, and 49d, an image is recorded in a predetermined recording area, and thus, the multi photography mode is carried out.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 8-67288 (filed on Feb. 28, 1996) and No. 8-209169 (filed on Jul. 19, 1996) which are expressly incorporated herein, by reference, in their entirety.

I claim:

1. A voltage control device for an electro-developing recording medium in which an image formed in said electro-developing medium is electronically developed by applying an electric voltage to said electro-developing medium, said device comprising:

a first control electrode provided at a portion corresponding to a first surface of said electro-developing recording medium;

a second control electrode provided at a portion corresponding to a second surface of said electro-developing recording medium, said second surface being opposite to said first surface;

a photography mode setting processor that enables selecting one of a plurality of photography modes;

an operating processor operating said first and second control electrodes so that an electric voltage applied to at least one of said first and second control electrodes is controlled in accordance with the signal output from the selection processor;

at least one of said first and second control electrodes being divided into a plurality of divided portions including first and second divided electrodes; and a selection processor that selects whether the first, second, or both divided electrodes are applied with said voltage, in accordance with the selected photography mode, the selection processor outputting a signal indicating which divided electrodes are applied with said voltage.

2. A voltage control device according to claim 1, wherein said operating processor selectively operates first and second divided electrodes.

3. A voltage control device according to claim 1, wherein said first divided electrode is provided at a portion corresponding to a first area of said electro-developing recording medium, and said second divided electrode is provided at a portion corresponding to a second area of said electro-developing recording medium.

4. A voltage control device according to claim 3, wherein a portion of said second divided electrode is provided above a periphery of said first divided electrode.

5. A voltage control device according to claim 1, wherein said first divided electrode is rectangular, and said second divided electrode is positioned adjacent each of the longer sides of the rectangle of said first divided electrode.

6. A voltage control device according to claim 1, wherein said first divided electrode is provided on a central portion of said electro-developing recording medium, and said second divided electrode is provided substantially on the entire surface of said electro-developing recording medium closer to the periphery of said electro-developing recording medium.

7. A voltage control device according to claim 1, wherein said first and second divided electrodes are congruent rectangles, and are positioned adjacent to each other.

8. A voltage control device for an electro-developing recording medium in which an image formed in said electro-developing recording medium is electronically developed by applying an electric voltage to said electro-developing recording medium, said device comprising:

a common electrode provided at a portion corresponding to a first surface of said electro-developing recording medium;

first and second divided electrodes provided at a portion corresponding to a second surface of said electro-developing recording medium, said second surface being opposite to said first surface;

a photography mode setting processor that enables selecting one of a plurality of photography modes;

an operating processor operating said common electrode and said first and second control electrodes; and a selection processor that selects whether the first, second, or both divided electrodes are applied with said voltage in accordance with the selected photography mode, the selection processor outputting a signal indicating which divided electrodes are applied with said voltage.

* * * * *

UNITED STATES PATENT AND TRADEMARK OFFICE
CERTIFICATE OF CORRECTION

PATENT NO. : 5,943,518
DATED : August 24, 1999
INVENTOR(S) : K. SATO

It is certified that error appears in the above-identified patent and that said Letters Patent is hereby corrected as shown below:

At column 11, line 53 (claim 1, line 14) of the printed patent, after ""photography modes" insert, in a new paragraph, the following:
---a selection processor that selects whether the first, second, or both divided electrodes are applied with said voltage, in accordance with the selected photography mode, the selection processor outputting a signal indicating which divided electrodes are applied with said voltage;---

At column 11, line 58 (claim 1, line 19) of the printed patent, after "processor;" insert ---and---.

At column 12, line 3 (claim 1, line 22) of the printed patent, after "electrodes" insert ---.---, and delete "; and a selection processor that selects whether the first, second, or both divided electrodes are applied with said voltage, in accordance with the selected photography mode, the selection processor outputting a signal indicating which divided electrodes are applied with said voltage."

Signed and Sealed this

Sixth Day of March, 2001

*Attest:*

NICHOLAS P. GODICI

*Attesting Officer*  *Acting Director of the United States Patent and Trademark Office*